United States Patent [19]

Cook

[11] Patent Number: 5,479,718
[45] Date of Patent: Jan. 2, 1996

[54] SHAFT ALIGNMENT DEVICE

[75] Inventor: Thomas E. Cook, Kalamazoo, Mich.

[73] Assignee: Durametallic Corporation, Kalamazoo, Mich.

[21] Appl. No.: 277,329

[22] Filed: Jul. 19, 1994

[51] Int. Cl.⁶ ........................................ G01B 5/24
[52] U.S. Cl. ............................... 33/412; 33/661
[58] Field of Search ..................... 33/412, 286, 529, 33/533, 645, 655, 661

[56] References Cited

U.S. PATENT DOCUMENTS

| | | | |
|---|---|---|---|
| 2,516,854 | 8/1950 | Christian . | |
| 2,638,676 | 5/1953 | Callahan | 33/412 |
| 2,656,607 | 10/1953 | Harding | 33/412 |
| 2,815,582 | 12/1957 | Karstens | 33/661 |
| 2,833,051 | 5/1958 | Cunningham . | |
| 3,664,029 | 5/1972 | Glucoft et al. | 33/412 |
| 3,783,522 | 1/1974 | Dodd | 33/661 |
| 4,161,068 | 7/1979 | McMaster | 33/412 |
| 4,367,594 | 1/1983 | Murray, Jr. | 33/661 |
| 4,413,415 | 11/1983 | Stovall | 33/661 |
| 4,516,328 | 5/1985 | Massey | 33/412 |
| 4,534,114 | 8/1985 | Woyton et al. | 33/412 |
| 4,586,264 | 5/1986 | Zatezalo | 33/412 |
| 4,964,224 | 10/1990 | Jackson | 33/655 |
| 5,371,953 | 12/1994 | Nower et al. | 33/412 |

FOREIGN PATENT DOCUMENTS 972407  1/1951  France .

OTHER PUBLICATIONS

Flexibox Limited "Training Manual", Jul. 1974, (4 pages).
Metastream "Alignment Equipment", Aug. 1980, Flexibox International, Flexibox Limited, (2 pages).
Metastream "Shaft and Coupling Alignment Equipment", Jun. 1981, Flexibox International, Flexibox Limited (4 pages).
Metastream "Installation and Operating Instructions for Metastream Type T&M Coupling", Cat. 205B, Flexibox Inc. (2 pages).
Metastream "Flexibox Shaft and Coupling Alignment Equipment", Flexibox Inc., Feb. 9, 1978, (4 pages).
V. R. Dodd, "Shaft-alignment monitoring cuts costs", The Oil and Gas Journal, Sep. 25, 1972, (6 pages).
V. R. Dodd, "Total Alignment", The Petroleum Publishing Company, Published 1975, Title pg., Preface, pp. i–ii, I–1 through I–6, II–1 through II–23, III–1 through III–39, and V–1 through V–8.

*Primary Examiner*—William A. Cuchlinski, Jr.
*Assistant Examiner*—G. Bradley Bennett
*Attorney, Agent, or Firm*—Flynn, Thiel, Boutell & Tanis

[57] ABSTRACT

A shaft alignment wherein a pair of substantially identical clamping members are mounted on the shafts which are to be aligned, with each clamping member having a peripheral reading surface which is generally flat. Each clamping member has a support rod adjustably positioned thereon and projecting generally axially in a skewed relationship relative to the axial direction of the shaft. Each support rod mounts a gauge assembly adjustably positioned for cooperation with the flat reading surface on the other clamping member. The clamping members are mounted on the shafts so as to be generally axially aligned, whereupon the skewed relationship of the support rods permits them to be positioned in generally parallel relationship with one another, with the respective gauge assemblies being adjustably positioned to cooperate with the reading surface on the opposed clamping member.

5 Claims, 4 Drawing Sheets

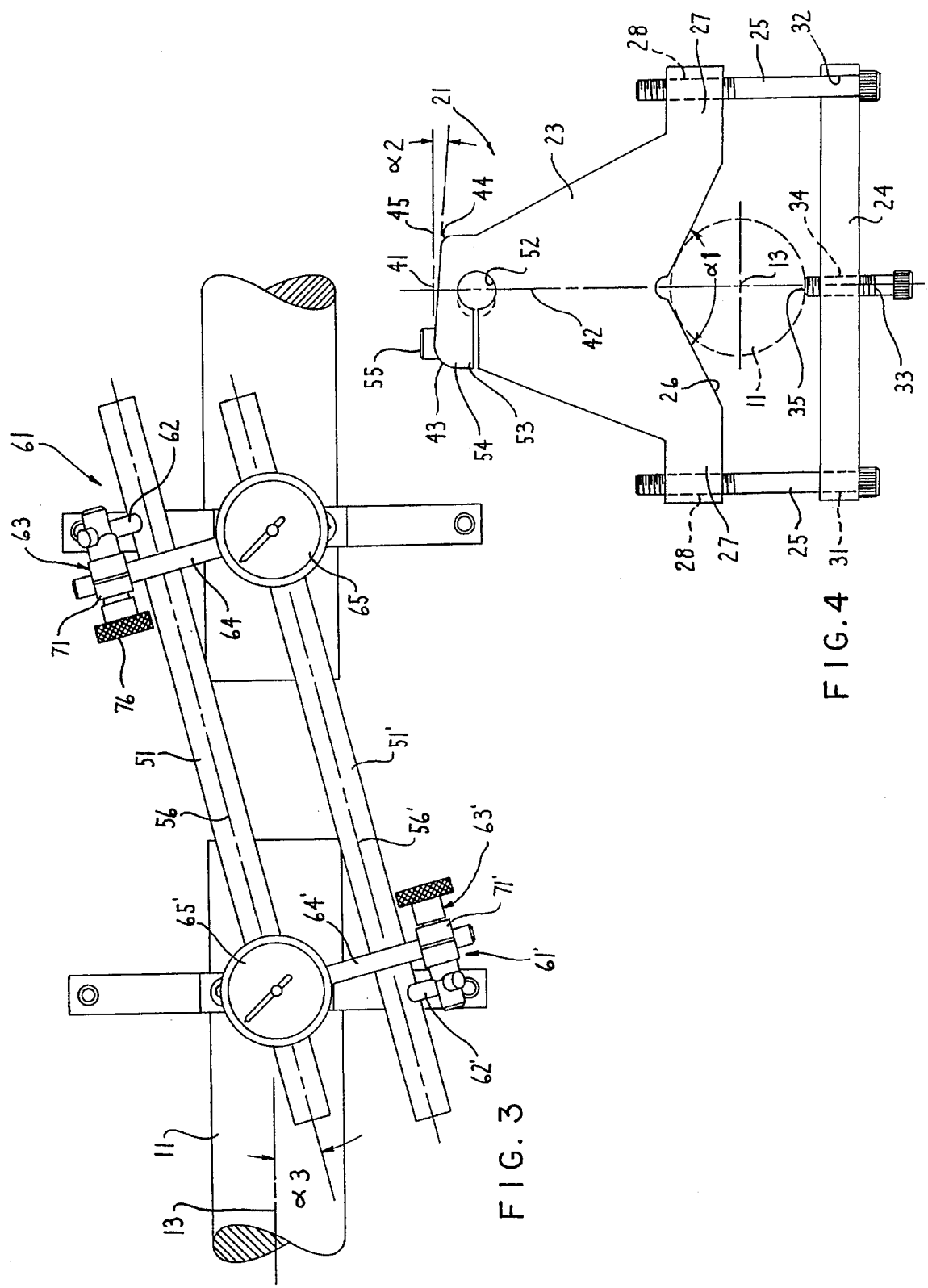

SHAFT ALIGNMENT DEVICE

FIELD OF THE INVENTION

This invention relates to an improved shaft alignment device of the type having opposed clamping members which respectively mount on shafts which are to be aligned, which clamping members mount thereon adjustable gauge holders provided with dial indicator gauges which cooperate with reading surfaces provided on the clamping members.

BACKGROUND OF THE INVENTION

When coupling two rotary shafts together, such as the shafts of a pump and motor for example, accurate alignment of the shafts both vertically and horizontally is required. Failure to accurately align the coupled shafts can result in undesired failure or performance conditions, including undesired vibration, excessive bearing wear and ultimate failure, and the like.

In an attempt to overcome such problems and provide accurate alignment between coupled shafts which are driven one from the other, numerous alignment devices have been developed and utilized, with varying degrees of efficiency and success.

One known alignment device is illustrated by U.S. Pat. No. 4,516,328 (Massey). The alignment device of this patent includes two clamping members, each adapted for mounting on a respective shaft, and each having a reading surface thereon which is of arcuate configuration generated on a radius centered substantially on the axis of the shaft. Each clamping member has a support rod which projects axially in parallel relation with the shaft, and this support rod mounts a gauge assembly which cooperates with the reading surface of the other clamping member. The clamping members when mounted on the shaft are generally circumferentially angularly spaced so that the support rods extend generally parallel with one another in sidewardly spaced and hence noninterfering relationship, and also generally parallel to the shaft axes, so that each gauge cooperates with the reading surface of the other clamping member. This arrangement is desirable in that both gauges are positioned generally in the same circumferential plane, that is, on the same diametral side of the shaft.

Numerous other alignment devices have been developed, and examples of same are disclosed in U.S. Pat. No. 3,664,029 (Glucoft), and U.S. Pat. No. 3,785,522 (Dodd).

The present invention relates to a shaft alignment device which is generally of the type described above, but which incorporates therein improved structural and functional features which are believed to improve the efficiency and economy of manufacture, and at the same time improve the simplicity of operation.

More specifically, in the shaft alignment of this invention according to a preferred embodiment thereof, a pair of substantially identical clamping members are provided for simple mounting on the shafts which are to be aligned, with each clamping member having a peripheral reading surface which is generally flat and preferably defines a plane which has a slight slope relative to a tangent circular profile contacting the plane. Each clamping member has a support rod adjustably positioned thereon and projecting generally axially, with the support rod being disposed in a skewed or angled relationship relative to the axial direction of the shaft. Each support rod mounts a gauge assembly adjustably positioned thereon for cooperation with the flat reading surface on the other clamping member. The clamping members can be mounted on the shafts so that the clamping members are generally axially aligned, whereupon the angled or skewed relationship of the support rods permits them to be positioned in generally parallel relationship with one another, with the respective gauge assemblies being adjustably positioned to cooperate with the reading surface on the opposed clamping member. The skewed relationship of the support rods relative to the shaft axes provides increased flexibility with respect to use of the alignment device inasmuch as axial adjusting movement of the support rods relative to the respective clamping members provides both axial and circumferential adjustability.

Other structural and functional features of the invention, and objects and purposes thereof, will be apparent to persons familiar with devices of this general type upon reading the following specification and inspecting the accompanying drawings.

BRIEF DESCRIPTION OF THE DRAWINGS

FIG. 3 is a top view of the device as appearing in FIG. 2.

FIG. 4 is an end view of the device as taken from the left side of FIG. 2.

Figure 1:
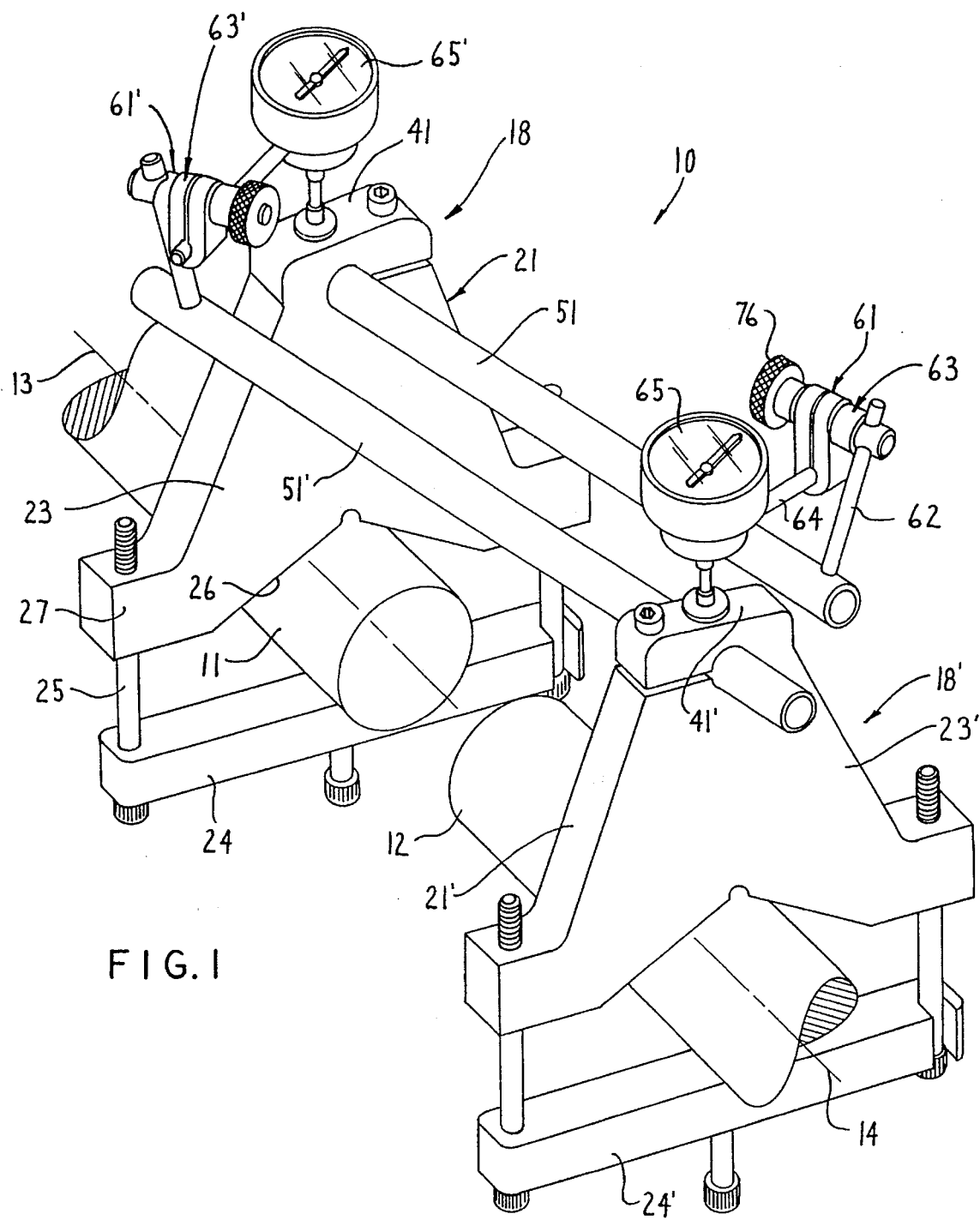
FIG. 1 is a perspective view of the alignment device according to the present invention, the device being positioned for cooperation between a pair of shafts which are to be coupled together in aligned relation.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Referring to FIG. 1, there is illustrated a shaft alignment device 10 according to the present invention. This device 10 cooperates with a pair of approximately aligned shafts 11 and 12, the respective axes 13 and 14 of which may be slightly misaligned vertically and/or horizontally. The device 10 is utilized to determine the misalignment between the shafts 11 and 12 and hence permit suitable adjustment so as to achieve the desired degree of alignment accuracy so that the shafts can be suitably drivingly joined together, such as by a drive coupling (not shown).

The shaft alignment device 10 includes a pair of adjustable gauging assemblies 18 and 18' which are designed to cooperate with and mount on the pair of shafts, such as the shafts 11 and 12, whereby these adjustable assemblies 18 and 18' cooperate to determine the degree of misalignment, vertical and/or horizontal, between the axes 13 and 14. The adjustable assemblies 18 and 18' are substantially identical, and hence only the assembly 18 will be described in detail below, it being understood that the other assembly 18' possesses the same structural and functional features, and the parts of the assembly 18' are designated by the same reference numerals utilized to designate the parts of the assembly 18 except with the additional of a prime (') thereto.

Referring now to the structure of the adjustable assembly 18, it includes a clamping bracket 21 which is adapted for clamping engagement about one of the shafts, such as the shaft 11. The bracket 21 is of two main pieces and specifically includes a main bracket member 23 and a bracket end member 24, which members 23 and 24 are suitably secured together in surrounding relationship to a shaft by a pair of fasteners such as screws 25.

The main bracket member 23 (FIGS. 1 and 4) is a platelike member, such as by being constructed of aluminum plate, having a generally V-shape notch or surface 26 which opens inwardly from one end of the member for partially accommodating the shaft therein. The included angle $\alpha 1$ defined by the opposed sides or surfaces of the V-shaped notch 26 is preferably in the range of about 90° to about 135°, depending upon the range of shaft diameters for which the assembly is designed to accommodate. This inner end of bracket member 23 also has a pair of arm portions 27 which project outwardly in opposite directions on opposite sides of the V-shaped notch, which armed portions have threaded openings 28 extending therethrough for engagement with the screws 25.

The bracket end member 24 is adapted to be disposed adjacent and generally opposed to the inner end of the main bracket member 23 for accommodating the shaft therebetween. This end member 24 comprises a generally elongate member, such as a small bar or platelike member of generally rectangular cross section, having a length which generally corresponds to the length of the inner end of the main bracket member 23 as defined between the arm portions 27 thereof. The end member 24 has an opening 31 extending therethrough adjacent one end thereof for accommodating one of the screws 25, and a further opening 32 extends through the other end thereof for accommodating the other screw 25. This latter opening 32, however, is preferably defined as a slot which also opens sidewardly through the end member since this enables the respective screw 25, when loosened, to be moved sidewardly out of the opening 32, thereby enabling the end member 24 to be rotated about the other securing screw 25 relative to the main bracket member 23 so as to facilitate the mounting or removal of the clamping bracket 21 relative to the shaft by permitting such mounting or removal to occur in a sideward direction relative to the shaft axis.

The bracket end member 24 also has a shaft contacting member 33 mounted centrally thereof, this member 33 in the illustrated embodiment comprising a screw which is threadedly engaged within an opening 34 which extends through the end member. This opening 34 generally extends parallel with but is disposed midway between the openings 31 and 32. The shaft contacting screw 33 has a contact surface 35 on the free end thereof which is adapted for engagement with the shaft, such as shaft 11, so as to enable the clamping bracket 21 to be securely supported on the shaft by a three-point engagement, two being defined on the opposite sides of the V-shaped notch 26, the other being defined by the contact point 35. This contact screw 33 is disposed so that the axis thereof substantially perpendicularly intersects the shaft axis and is substantially aligned with the apex of the V-shaped notch 26.

The other end, namely the radially outer end, of the main bracket member 23 has an end surface 41 thereon which functions as the reading surface for measuring misalignment. This end surface 41 is a substantially flat or planar surface which is elongated in the circumferential direction of the bracket member, and faces radially outwardly, with opposite ends of this end surface 41 being terminated at sharply rounded corners or edges 43 and 44 which merge into the side surfaces of the bracket member. This flat reading surface 41 is disposed such that the center or mid-portion thereof is substantially intersected by a radial line 42 which projects outwardly from the shaft axis 13 so as to substantially intersect the apex of the V-notch 26, this radial line 42 substantially comprising an extension of the axis of the contact screw 33. This radial line 42 in effect defines an axially extending plane which contains the shaft axis 13 therein.

The flat reading surface 41 intersects the line or plane 42 preferably in nonperpendicular relationship, with the plane of reading surface 41 being sloped at a small angle $\alpha 2$ relative to a perpendicular 45 to the plane 42. This angle $\alpha 2$ is normally in the range of about 3° to about 5°.

The adjustable assembly 18 also includes an elongate support member 51 which is mounted on the main bracket member 23 so as to permit selected adjustment in the position of the support member 51. This member 51, in the illustrated embodiment, comprises an elongate cylindrical rod, preferably a hollow tube, which is supported within a cylindrical opening 52 which is formed in and extends through the thickness of the main bracket member 23 generally in the axial direction thereof. This cylindrical opening 52 is oriented a small distance inwardly from the flat reading surface 41, with the opening 52 being generally positioned so that the opening intersects the axial plane 42.

The main bracket member 23, adjacent the radial outer end thereof, has a slit or split 53 which is formed therein so that the split opens inwardly from one side surface and communicates substantially with the diametral plane of the opening 52. This split 53 results in the formation of a cantilevered portion 54 which is defined on one side of the opening 52 and extends radially between the split 53 and the flat reading surface 41. A fastener such as a screw 55 is rotatably supported within an opening which extends through the cantilevered portion 54, with the screw 55 being suitably threadedly engaged within an opening formed in the main bracket member, whereby the screw 55 spans the split 53 to permit contraction of the split to cause the cylindrical support rod 51 to be fixedly clamped at a selected position by its engagement with the cylindrical wall of the opening 52.

The opening 52 is not oriented in a pure axial direction, but rather is oriented such that the axis 56 thereof extends in a slightly sloped or skewed relationship relative to the axially extending direction as represented by the shaft axis 13. This skewed relationship is illustrated in FIG. 3, and the slope or skewed angle $\alpha 3$ is normally in the range of from about 10° to about 20°, with the preferred angle being about 15°.

The support rod 51 mounts thereon, adjacent the free end thereof so as to be in axially spaced relation from the clamping bracket, an indicator assembly 61. This assembly includes a rodlike support element 62 which is fixedly secured to the support rod 51 adjacent the free end thereof, with the element 62 projecting radially therefrom in a cantilevered manner. An adjustable clamping device 63 is longitudinally slidably supported on the support element 62, and this adjustable clamping device 63 in turn slidably supports an elongate secondary rod 64 which has one end thereof fixedly secured to the housing of a conventional dial indicator gauge 65. This indicator gauge 65 generally comprises a conventional gauge, such as a Starrett indicator gauge having a visible dial and a moving indicator needle, the position of which is controlled by a movable feeler 66 which slidably projects outwardly from the underside of the gauge housing.

The adjustable clamping device 63, and its cooperation with the rods 62 and 64 which extend in nonintersecting and angled relationship to one another, is such as to allow the indicator gauge 65 to have three-directional movement relative to the support rod 51 so as to permit proper positioning of the indicator gauge for engagement with the adjacent flat reading surface 41' associated with the other assembly 18'.

To permit this three-dimensional adjustability, the adjustable clamp device 63 includes a generally split or U-shaped clamp member 71 having a first opening 72 extending therethrough adjacent one end thereof, which opening 72 slidably accommodates the indicator support rod 64. A slit or split 73 communicates at its inner end with this opening 72 throughout the axial length thereof, with the split 73 opening outwardly through the other end of the body or clamp member 71 so as to effectively define a pair of adjacent leg portions as disposed on opposite sides of the split. A further cylindrical opening 74 extends through the body 71 adjacent the other end thereof, this opening extending through the leg portions in generally perpendicular relationship to the split 73, whereby the axis of this opening 74 is generally perpendicular to the axis of the opening 72. An elongate cylindrical actuating shaft 75 extends through and projects outwardly from opposite ends of the opening 74 and is rotatably supported within this opening. One projecting end of the actuating shaft 75 has a threaded portion on which is coaxially threadedly mounted an actuating knob 76, the latter preferably being provided with a knurled or roughened exterior surface to facilitate manual gripping thereof. The opposite projecting end of the actuating shaft 75 has an opening 77 formed through the shaft in perpendicular relationship to the shaft axis, which opening is formed directly adjacent the free end of the actuating shaft and has a generally cylindrical cross section so as to rotatably and axially slidably accommodate therein the rod 62 which is fixed to and projects radially from the support rod 51. A clamping sleeve portion 78 surrounds the actuating shaft 75 and is disposed axially between the rod 62 and the clamp body 71 so as to permit a clamping securement of the rod 62 within the opening 77 when the knob 76 is manually rotated to tighten the clamping device.

With the clamping device 61, by loosening the knob 76 by rotation thereof in one direction so as to effect loosening of the knob relative to the threaded end of the actuating shaft 75, this releases the compression on the split 73 of the clamp body 71, and also loosens the compression of the clamp sleeve 78 against the rod 62. This enables the entire clamping device 61 to be freely slidably displaced longitudinally along the support rod 62, and at the same time the clamping device can be rotated about the support rod 62, thereby permitting substantial adjustment in the position of the gauge support rod 64 carried on the clamping body 71. At this time the clamp body 71 can also be rotatably swung about the axis of the actuating shaft 75, causing swinging displacement of the indicator assembly 61, in its entirety, about the axis of the actuating shaft. The gauge support rod 64 itself can also be slidably moved through the opening 72 of the clamp body 71 to further adjust the position of the indicator gauge 65 until such gauge is positioned whereby the desired contact occurs between the feeler 66 and the flat reading surface 41'. Thereafter the knob 76 is manually rotated in the reverse direction to tighten the clamping device, thereby fixedly securing the engagement of the actuating rod 74 to the rod 62, and additionally fixedly securing the position of the gauge support rod 64 relative to the clamp body 71 as well as nonrotatably securing the clamp body 71 relative to the actuating shaft 75.

The operation of the shaft alignment device 10 accordingly to the present invention will now be briefly described.

The apparatus 10 is used for shaft alignment of in-line rotary shafts, such as shafts associated with a motor and pump, which shafts are intended for connection by a suitable coupling. The shafts, such as the shafts 11 and 12 of FIG. 1, are disposed so that one of the shafts is in a generally fixed position, and the other in an adjustable position so as to permit suitable relative positional adjustment to achieve desired in-line alignment.

Figure 2:
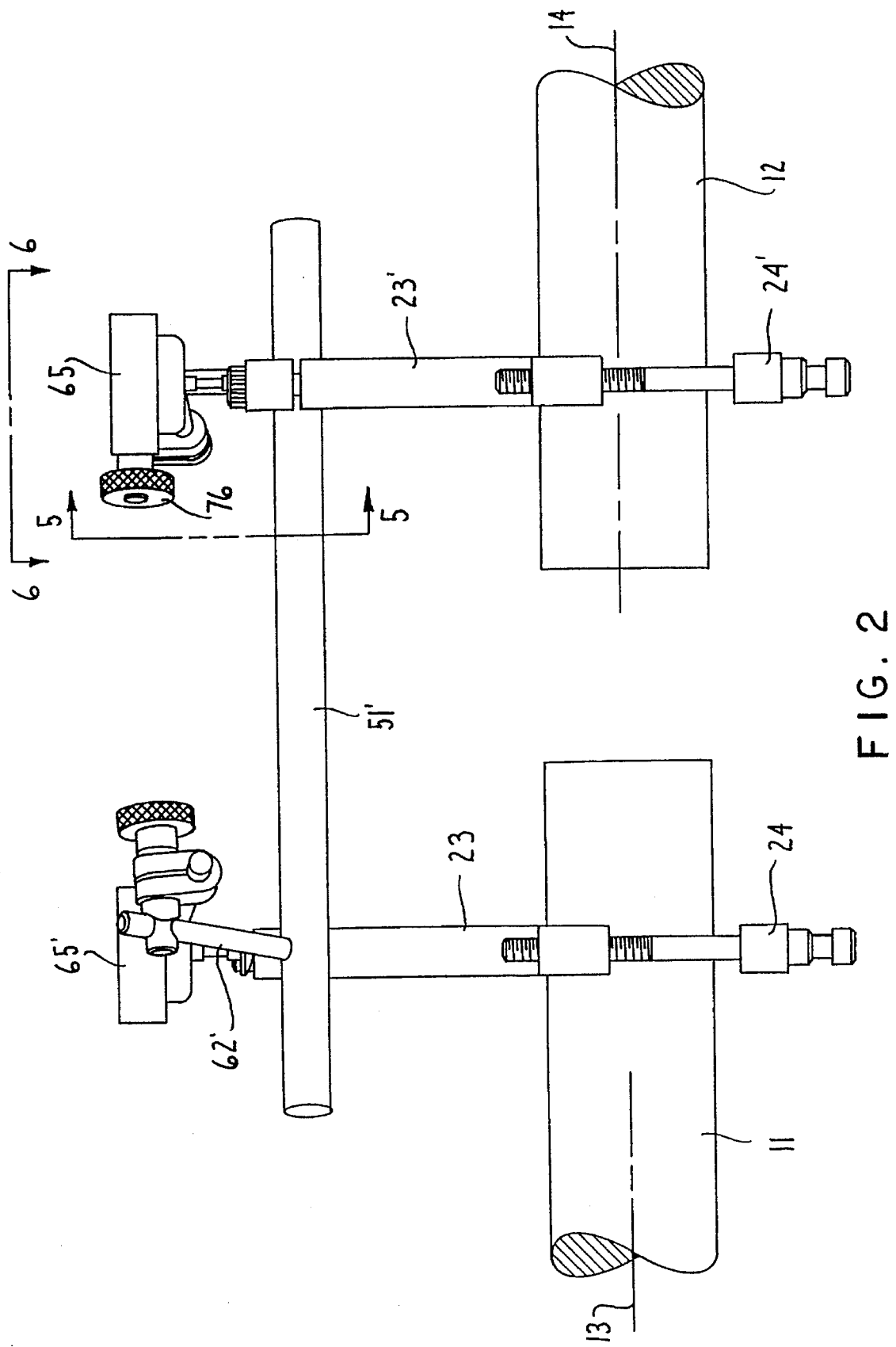
FIG. 2 is a side view of the alignment device.
Figure 6:
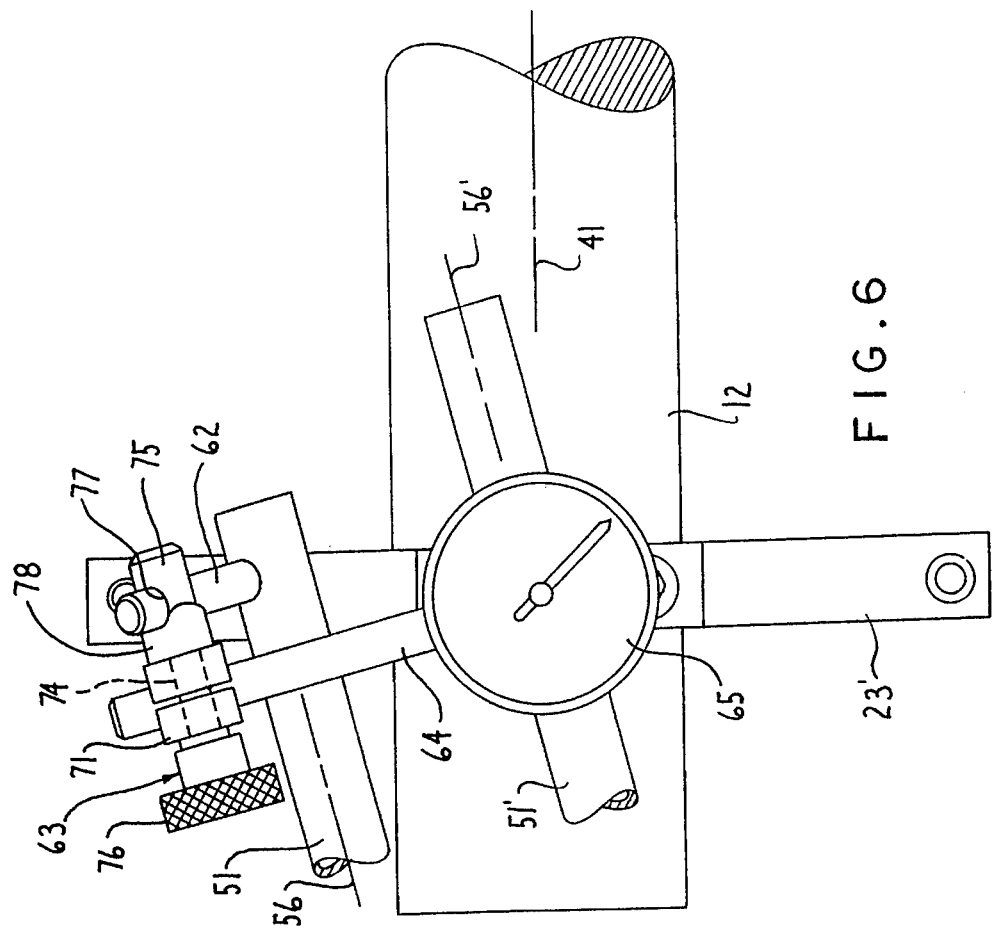
FIG. 6 is an enlarged fragmentary view taken generally along line 6—6 in FIG. 2.
Figure 5:
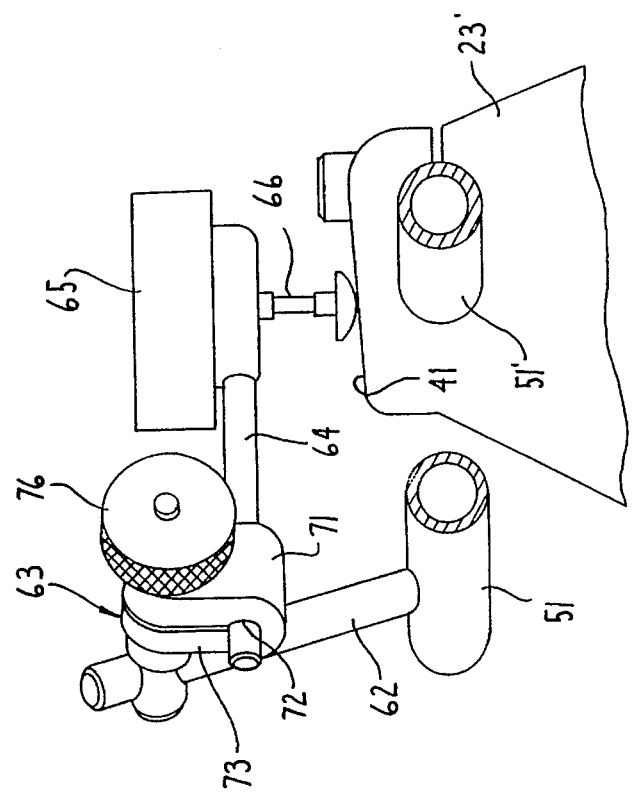
FIG. 5 is an enlarged, fragmentary sectional view taken generally along line 5—5 in FIG. 2.

The clamping brackets 21 and 21' are secured in position on the respective shafts 11 and 12 substantially as shown in FIGS. 1 and 2, with the clamping members being generally coaxially aligned and disposed in opposed or facing relationship whereby the axes of the openings 52 and 52' extend in generally parallel relationship to one another but are individually skewed relative to the shaft axes. The clamping brackets, due to their two-piece construction, can be secured to a substantial range of shaft diameters, such securement being illustrated by FIG. 4.

The clamping members 21 and 21' are secured to the respective shafts so that the respective support rods 51 and 51' project generally toward one another so that the support rods are positioned in generally sidewardly spaced but parallel relationship, with the pair of rods being skewed relative to the shaft axes as appearing in FIG. 3. Each support rod, such as the rod 51, can be axially slidably moved through the respective bracket member opening 52 so as to position the respective indicator assembly 61 in close proximity to the cooperating flat reading surface 41', including any necessary rotation of the rod 51 within the clamp member opening 52 so as to provide the desired positioning of the indicator device. Thereafter the screw 55 is tightened to fixedly secure the rod 51 in the selected position. A similar positing technique is carried out with respect to the rod 51' of the other assembly 18'.

Thereafter the indicator assemblies 61 and 61' are individually positionally adjusted, such as by loosening the respective adjustable clamp devices 63 and 63', followed by relative movement of the parts thereof as explained above so that the respective dial indicator gauges 65 and 65' are positioned so that the movable feelers thereof are engaged with the central portion of the respective flat reading surfaces 41' and 41. The clamping devices 63 and 63' are then retightened so as to fix the positions of the indicator devices.

The dial indicator gauges are then manually adjusted to effect a zero reading. Both clamping brackets and their respective shafts are then rotated 180°. If the shafts are misaligned within the plane defined by the beginning and ending positions of the clamping brackets, then the dial gauges will register a reading which is different from zero, such indicator readings being an indication of both the direction and magnitude of misalignment. Suitable repositioning of one of the shafts can then be carried out, and the alignment reading procedure is then repeated to ensure that the shafts are ultimately aligned within the required degree of accuracy.

By using the technique indicated above, and specifically by moving the clamping brackets between upper and lower positions spaced 180°, this provides an indication as to the degree of misalignment in a vertical plane. A similar procedure is used by clamping the clamping brackets to the shafts adjacent one side thereof, and then rotating them 180° to the other side thereof, so as to permit a determination as to the misalignment which exists within a horizontal plane.

The actual steps involved in utilizing the indicator readings so as to permit adjustment in the shaft position is conventional, and further detailed description thereof is believed unnecessary.

The skewed but parallel relationship of the support rods 51 and 51', their axial and rotatable adjustability with respect to the respective clamping brackets, and the additional adjustability provided by the three-dimensional adjustable movement of the indicating devices 61 and 61' relative to the respective support rods, greatly facilitates the initial setup of the alignment device and the positioning of the indicators relative to the reading surfaces with which they are to engage. This greatly simplifies the use of the alignment device, including setup time, alignment determination and adjustment time, and removal time.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A shaft alignment device for aligning first and second shafts which are disposed in generally adjacent but opposed in-line relation, comprising:

first and second substantially identical gauging assemblies adapted for mounting on the respective first and second shafts in generally axially opposed relation for measuring misalignment, each gauging assembly including:

(a) a clamping bracket adapted to be releasably fixed to one of said shafts in generally surrounding relationship thereto, said clamping bracket having a body part which projects radially outwardly of the respective shaft and which defines thereon a radially outwardly facing peripheral surface which functions as a reading surface, (b) an elongate support rod mounted on said clamping bracket in radially outwardly spaced relation from the shafts and projecting generally axially away from the clamping bracket generally toward the clamping bracket of the other gauging assembly, said support rod at its point of engagement with said clamping bracket being disposed in close proximity to the respective reading surface, and said support rod being disposed with the axis thereof in skewed relation relative to an axial plane which intersects the rod axis and passes through the axis of the respective shaft, (c) a dial indicator gauge positioned adjacent and spaced laterally from a free end of said support rod, said dial indicator gauge having a feeler adapted to be positioned for contact with the reading surface of the other clamping bracket associated with the other gauging assembly as positioned on the other shaft, and (d) a gauge mounting arrangement mounted on said support rod adjacent the free end thereof and projecting radially thereof for supporting said dial indicator gauge in spaced relation from the respective support rod, said gauge holding arrangement including means for permitting the position of the dial indicator gauge to be adjusted relative to the respective support rod;

said first and second gauging assemblies when mounted respectively on said first and second shafts being disposed with the respective clamping brackets in generally axially opposed relation so that the reading surfaces are disposed generally on the same diametral side of the shafts and the dial indicator gauge on one assembly contacts the reading surface of the other assembly and vice versa, the support rods of the assemblies projecting axially generally toward the opposed clamping bracket so that the support rods of said two assemblies are disposed in generally sidewardly spaced but parallel relationship with said support rods both projecting in skewed relation relative to an axial plane, whereby readings are taken by the dial indicator gauges at the reading surfaces in different angular orientations of the alignment device as mounted on the shafts to determine the amount of misalignment.

2. An alignment device according to claim 1, wherein the reading surface is a generally flat and planar surface which is elongated in a generally circumferential direction.

3. An alignment device according to claim 2, wherein the flat and planar reading surface circumferentially projects at a small angle relative to a reference plane which perpendicularly intersects an axial plane which contains the respective shaft axis and a midpoint of the reading surface.

4. An alignment device according to claim 3, wherein the clamping bracket has an opening extending therethrough in adjacent but radially inwardly spaced relationship from said reading surface, said opening being disposed with the axis thereof skewed at a small intersecting angle relative to the axial plane, and said support rod being supported within and projecting outwardly from said opening so that the support rod can be both rotatably and axially movably positioned relative to the clamping bracket, and a securing fastener associated with the clamping bracket for fixedly stationarily positioning the support rod within the opening of the clamping bracket at a selected position.

5. A shaft alignment device for aligning first and second shafts which are disposed in generally adjacent but opposed in-line relation, comprising:

first and second substantially identical gauging assemblies adapted for mounting on the respective first and second shafts in generally axially opposed relation for measuring misalignment, each gauging assembly including:

(a) a clamping bracket adapted to be releasably fixed to one of said shafts in generally surrounding relationship thereto, said clamping bracket having a body part which projects radially outwardly of the respective shaft and which defines thereon a radially outwardly facing flat and planar peripheral surface which functions as a reading surface, (b) the flat and planar reading surface projecting circumferentially at a small angle relative to a reference plane which perpendicularly intersects an axial plane which contains the respective shaft axis and a midpoint of the reading surface, (c) an elongate support rod mounted on said clamping bracket in radially outwardly spaced relation from the shafts and projecting generally axially away from the clamping bracket generally toward the clamping bracket of the other gauge assembly, said support rod at its point of engagement with said clamping bracket being disposed in close proximity to the respective reading surface, (d) a dial indicator gauge positioned adjacent and spaced laterally from a free end of said support rod, said dial indicator gauge having a feeler adapted to be positioned for contact with the reading surface of the other clamping bracket associated with the other gauging assembly as positioned on the other shaft, and (e) a gauge mounting arrangement mounted on said support rod adjacent the free end thereof and projecting radially thereof for supporting said dial indicator gauge in spaced relation from the respective support rod, said gauge holding arrangement including means for permitting the position of the dial indicator gauge to be adjusted relative to the respective support rod;

said first and second gauging assemblies when mounted respective on said first and second shafts being disposed with the respective clamping brackets in generally axially opposed relation so that the reading surfaces are disposed generally on the same diametral side of the shafts and the dial indicator gauge on one assembly contacts the reading surface of the other assembly and vice versa, the support rods of the assemblies projecting axially generally toward the opposed clamping bracket so that the support rods of said two assemblies are disposed in generally sidewardly spaced but parallel relationship with said support rods both projecting in skewed relation relative to an axial plane, whereby readings are taken by the dial indicator gauges at the reading surfaces in different angular orientations of the alignment device as mounted on the shafts to determine the amount of misalignment.

* * * * *